United States Patent [19]

Hensley, Jr. et al.

[11] Patent Number: 4,493,761

[45] Date of Patent: Jan. 15, 1985

[54] CATALYTIC HYDROLIQUEFACTION USING A CR-MO-GROUP VIII CATALYST

[75] Inventors: Albert L. Hensley, Jr., Munster, Ind.; Leonard M. Quick, Bridgewater Township, Somerset County, N.J.

[73] Assignee: Standard Oil Company (Indiana), Chicago, Ill.

[21] Appl. No.: 558,093

[22] Filed: Dec. 5, 1983

[51] Int. Cl.$^3$ .............................. C10G 1/08
[52] U.S. Cl. ...................... 208/10; 585/240
[58] Field of Search ............ 208/10, 216 PP; 585/240

[56] References Cited

U.S. PATENT DOCUMENTS

| | | | |
|---|---|---|---|
| 3,840,473 | 10/1974 | Beuther et al. | 502/220 |
| 4,081,361 | 3/1978 | Hildebrand et al. | 208/10 |
| 4,181,602 | 1/1980 | Quick et al. | 208/216 PP |
| 4,188,284 | 2/1980 | Quick et al. | 208/216 PP |
| 4,191,635 | 3/1980 | Quick et al. | 208/216 PP |
| 4,225,421 | 9/1980 | Hensley, Jr. et al. | 208/216 PP |
| 4,267,033 | 5/1981 | Heck et al. | 208/254 H |
| 4,306,965 | 12/1981 | Hensley, Jr. et al. | 208/251 H |

*Primary Examiner*—Delbert E. Gantz
*Assistant Examiner*—Lance Johnson
*Attorney, Agent, or Firm*—James R. Henes; William H. Magidson; William T. McClain

[57] ABSTRACT

Disclosed is a method for the catalytic hydroliquefaction of solid carbonaceous material with a catalyst consisting essentially of Cr and Mo on a support or Cr, Mo and either CO or Ni on a support. The average pore diameter should be within 100–200Å.

19 Claims, 2 Drawing Figures

4,493,761

CATALYTIC HYDROLIQUEFACTION USING A CR-MO-GROUP VIII CATALYST

BACKGROUND OF THE INVENTION

1. Field of the Invention

This invention relates generally to a hydrocarbon conversion method and more particularly concerns a method for recovering upgraded liquid products from solid carbonaceous materials.

2. Description of the Prior Art

It has been found that the addition of a chromium component to catalysts comprising a Group VIB metal either alone or promoted by a Group VIII metal component and deposited on a support having a narrow pore distribution gives highly desirable results in certain specific applications. For example, Quick et al., U.S. Pat. No. 4,181,602 disclose a process for hydrotreating a heavy hydrocarbon stream containing metals, asphaltenes, nitrogen compounds, and sulfur compounds, which process comprises contacting the stream under suitable conditions and in the presence of hydrogen with a catalyst comprising a hydrogenating component selected from the group consisting of (1) molybdenum, chromium and a small amount of cobalt, (2) their oxides, (3) their sulfides, and (4) mixtures thereof on a large-pore, catalytically active alumina, and having a pore volume, as determined by nitrogen desorption, within the range of about 0.4 cc/gm to about 0.8 cc/gm, a surface area within the range of about 150 m²/gm to about 300 m²/gm, and an average pore diameter within the range of about 100 Å to about 200 Å. The catalyst that is employed in the process disclosed in U.S. Pat. No. 4,181,602 has about 0% to about 10% of its pore volume in pores having diameters that are smaller than 50 Å, about 30% to about 80% of its pore volume in pores having diameters of about 50 Å to about 100 Å, about 10% to about 50% of its pore volume in pores having diameters of about 100 Å to about 150 Å, and about 0% to about 10% of its pore volume in pores having diameters that are larger than 150 Å. Typical feedstocks that can be treated by the process disclosed in U.S. Pat. No. 4,181,602 include crude oils, topped crude oils, petroleum hydrocarbon residua, both atmospheric and vacuum residua, oils obtained from tar sands and residua derived from tar sand oil, and hydrocarbon streams derived from coal.

Quick et al., U.S. Pat. No. 4,188,284 disclose a process for hydrotreating a heavy hydrocarbon stream containing metals, asphaltenes, nitrogen compounds, and sulfur compounds, which process comprises contacting the stream under suitable conditions and in the presence of hydrogen with a catalyst comprising a hydrogenating component consisting essentially of a member selected from the group consisting of (1) molybdenum and chromium, (2) their oxides, (3) their sulfides, and (4) mixtures thereof on a large-pore, catalytically active alumina and having a pore volume, as determined by nitrogen desorption, within the range of about 0.4 cc/gm to about 0.8 cc/gm, a surface area within the range of about 150 m²/gm to about 300 m²/gm, and an average pore diameter within the range of about 100 Å to about 200 Å. The catalyst that is employed in the process disclosed in U.S. Pat. No. 4,188,284 has about 0% to about 10% of its pore volume in pores having diameters that are smaller than 50 Å, about 30% to about 80% of its pore volume in pores having diameters within the range of about 50 Å to about 100 Å, about 10% to about 50% of its pore volume in pores having diameters within the range of about 100 Å to about 150 Å, and about 0% to about 10% of its pore volume in pores having diameters that are larger than 150 Å. The process disclosed in U.S. Pat. No. 4,188,284 is stated to be useful for hydrotreating heavy hydrocarbon streams such as petroleum residua, both atmospheric resids and vacuum resids, tar sands oils, tar sands resids, and liquids obtained from coal. In addition, the process may be employed to satisfactorily hydrotreat petroleum hydrocarbon distillates, such as gas oils, cycle stocks, and furnace oils.

Quick et al., U.S. Pat. No. 4,191,635 disclose a process for cracking a heavy hydrocarbon stream containing metals, asphaltenes, nitrogen compounds, and sulfur compounds, which process comprises: (a) contacting the stream in a hydrotreating zone under hydrotreating conditions and in the presence of hydrogen with a hydrotreating catalyst comprising a hydrogenating component comprising at least the hydrogenating metals molybdenum and chromium, such hydrogenating metals being present in the elemental form, as oxides, as sulfides, or mixtures thereof, deposed on a large-pore, catalytically active alumina to reduce the metals content in the stream, to convert the asphaltenes, nitrogen compounds, and sulphur compounds in the stream, and to provide a hydrotreated product stream, said hydrotreating catalyst possessing a pore volume within the range of about 0.4 cc/gm to about 0.8 cc/gm, as determined by nitrogen desorption, a surface area within the range of about 150 m²/gm to about 300 m²/gm, and an average pore diameter within the range of about 100 Å (10 nm) to about 200 Å (20 nm); and (b) catalytically cracking at least a portion of said hydrotreated product stream in a catalytic cracking zone under catalytic cracking conditions and in the presence of a cracking catalyst to produce gasoline and distillates in improved yields.

The hydrotreating catalyst that is employed in the process disclosed in U.S. Pat. No. 4,191,635 can have about 0% to about 10% of its pore volume in pores having diameters that are smaller than 50 Å, about 30% to about 80% of its pore volume in pores having diameters of about 50 Å to about 100 Å, about 10% to about 50% of its pore volume in pores having diameters of about 100 Å to about 150 Å, and about 0% to about 10% of its pore volume in pores having diameters that are larger than 150 Å. The hydrogenating component of the hydrotreating catalyst can comprise further a small amount of the hydrogenating metal cobalt. The process disclosed in U.S. Pat. No. 4,191,635 comprises further contacting the heavy hydrocarbon stream in a demetallization zone under demetallization conditions and in the presence of hydrogen with a demetallization catalyst prior to contacting said stream in the hydrotreating zone with the hydrotreating catalyst. Typical feedstocks that can be treated satisfactorily by the process disclosed in U.S. Pat. No. 4,191,635 include crude oils, topped crude oils, petroleum hydrocarbon residua, both atmospheric and vacuum residua, oils obtained from tar sands and residua derived from tar sand oil, and hydrocarbon streams derived from coal.

Hensley et al., U.S. Pat. Nos. 4,224,144, 4,278,566 and 4,306,965 disclose a process comprising contacting a hydrocarbon stream such as a petroleum distillate or similar material with hydrogen and a catalyst comprising chromium, molybdenum, and at least one Group VIII metal hydrogenation component deposited on a porous refractory inorganic oxide support, which process is effective in the removal of both sulfur and nitrogen from such a hydrocarbon stream in contrast to a catalyst which does not contain chromium with Group VIII metal.

The finished catalyst that is disclosed in U.S. Pat. Nos. 4,224,144, 4,278,566 and 4,306,965 should have a pore volume within the range of about 0.4 cc/gm to about 0.8 cc/gm, as determined by nitrogen desorption, a surface area within the range of about 150 m$^2$/gm to about 300 m$^2$/gm, and an average pore diameter within the range of about 60 Å to about 200 Å. The catalyst disclosed broadly in U.S. Pat. Nos. 4,224,144 and 4,306,965 should have about 0% to about 50% of its pore volume in pores having diameters that are smaller than 50 Å, about 30% to about 80% of its pore volume in pores having diameters of about 50 Å to about 100 Å, about 0% to about 50% of its pore volume in pores having diameters of about 100 Å to about 150 Å, and about 0% to about 20% of its pore volume in pores that are larger than 150 Å. The catalyst disclosed in U.S. Pat. No. 4,278,566 and a preferred embodiment of the catalyst disclosed in U.S. Pat. Nos. 4,224,144 and 4,306,965 should have from 20 to 50% of its pore volume in pores having diameters that are smaller than 50 Å, about 30 to about 70% of its pore volume in pores having diameters of 50–100 Å, 0–20% of its pore volume in pores with diameters of 100–150 Å and 0–10% of its pore volume in pores with diameters greater than 150 Å.

Typical feedstocks that can be treated satisfactorily by the process disclosed in U.S. Pat. Nos. 4,224,144, 4,278,566 and 4,306,965 generally comprise distillates from petroleum and tar sands as well as similar materials such as shale oil and fractions thereof. In addition to removing sulfur and nitrogen, treatment of gas oil and similar heavy distillate streams at high temperature in the process of this invention can achieve substantial hydrocracking of heavy components in such feedstocks.

OBJECTS OF THE INVENTION

It is a general object of the present invention to provide an improved method for recovering upgraded liquid products from solid carbonaceous materials.

More particularly, it is an object of the present invention to provide an improved hydrocarbon conversion method which provides high desulfurization and denitrogenation activity and high activity for the conversion of a solid carbonaceous material to benzene- and hexane-soluble products.

It is another object of the present invention to provide an improved hydrocarbon conversion method which affords a high yield of products in the distillate range relative to the yield of products in the resid range and which involves the consumption of relatively small amounts of hydrogen in the conversion of a carbonaceous material.

It is also an object of the present invention to provide an improved hydrocarbon conversion method which minimizes catalyst deactivation.

Other objects and advantages of the invention will become apparent upon reading the following detailed description and appended claims and upon reference to the accompanying drawings.

SUMMARY

The present invention is a method for recovering liquid products from a solid carbonaceous material, comprising: contacting the carbonaceous material with hydrogen under hydrogenation conditions comprising a temperature in the range of from about 300° C. to about 500° C., in the presence of a hydrocarbon conversion catalyst comprising a molybdenum component and a chromium component deposed on porous refractory inorganic oxides support particles, wherein the finished catalyst has a surface area of from about 150 m$^2$/gm to about 300 m$^2$/gm, a total pore volume by nitrogen desorption measurement of from about 0.4 cc/gm to about 0.8 cc/gm, with an average pore diameter of from about 100 Å to about 200 Å, with each metal component being in the form of the elemental metal, its oxide or sulfide or a mixture thereof, with the molybdenum component at a concentration of from about 3 wt % to about 30 wt %, calculated as MoO$_3$ and based on the weight of the catalyst, and with the chromium component at a concentration of from about 2 wt % to about 20 wt %, calculated as Cr$_2$O$_3$ and based on the weight of the catalyst. The catalyst can comprise additionally at least one of a cobalt component and a nickel component, wherein each of the cobalt component and nickel component that is present in the form of the elemental metal, its oxide or sulfide or a mixture thereof and is at a concentration of from about 0.5 wt % to about 10 wt %, calculated as CoO or NiO, respectively, and based on the weight of the catalyst, and wherein, when the carbonaceous material is coal, coke, lignite or biomass, the carbonaceous material is also contacted with a hydrogen-donor solvent.

BRIEF DESCRIPTION OF THE DRAWINGS

For a more complete understanding of this invention, reference should now be made to the embodiments described below by way of examples of the invention and to the accompanying drawings. In the drawings.

Figure 1:
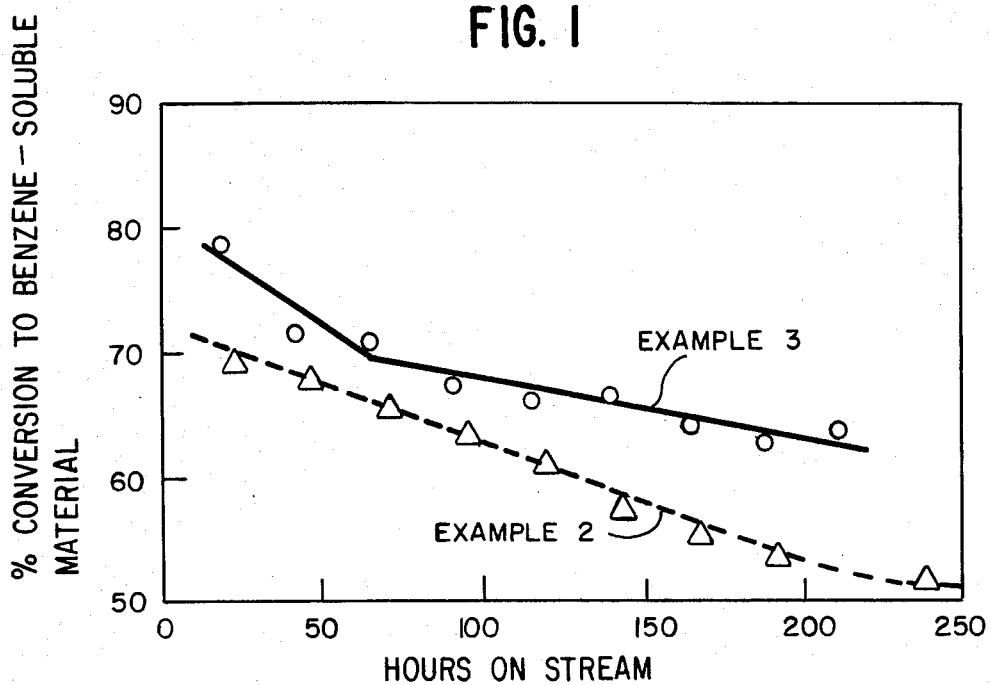
FIG. 1 is a plot of the extent of conversion in Examples 2 and 3 of coal to products which are soluble in benzene, versus the time on stream.

It should be understood, of course, that the invention is not necessarily limited to the particular embodiments illustrated herein.

DETAILED DESCRIPTION OF THE PREFERRED EMBODIMENTS

The BET surface area of the catalyst employed in the method of the present invention ranges from about 150 m$^2$/gm to about 300 m$^2$/gm, preferably from about 150 m$^2$/gm to about 250 m$^2$/gm. Surface areas less than 150 m$^2$/gm are disadvantageous because contact between the catalytically active sites and feed components is limited such that catalytic activity suffers. surface areas greater than about 300 m$^2$/gm are suitable from the standpoint of ensuring access of reactants to active sites; however, mechanical strength and bulk density decrease so much that the catalyst is easily damaged during use and must be replaced rapidly.

The support material of the finished catalyst employed in the method of the present invention has a total pore volume, based upon measurement by nitrogen desorption, in the range of from about 0.4 cc/gm to about 0.8 cc/gm, preferably from about 0.5 cc/gm to about 0.7 cc/gm. The average pore diameter of the catalyst employed in the method of this invention is from about 100 Å to about 200 Å, preferably from about 110 Å to about 150 Å, and is calculated by means of the expression $$A.P.D. = (4 \times P.V. \times 10^4)/S.A.$$

wherein A.P.D. is the average pore diameter in Å, P.V. is the aforesaid total pore volume in cc/gm, and S.A. is the BET surface area in m²/gm. This method of determining average pore diameter is discussed by F. C. Ciapetta and D. S. Henderson in an article in Oil and Gas Journal, Vol. 65, page 88 (1967).

Preferably, the catalyst employed in the method of this invention has from about 0% to about 10% of its total pore volume in pores having diameters under about 50 Å, about 30% to about 80% of its total pore volume in pores having diameters of about 50 Å to about 100 Å, about 10% to about 50% of its total pore volume in pores having diameters of about 100 Å to about 150 Å, and about 0% to about 20% of its total pore volume in pores having diameters that are larger than 150 Å.

The support component of the catalyst employed in the method of the present invention comprises at least one porous refractory inorganic oxide. The precise composition of the support is relatively unimportant so long as the required physical properties are attained. Examples of useful supports include alumina, silica, silica-alumina, stabilized alumina such as silica-stabilized alumina, phosphated alumina, stabilized phosphated-alumina such as silica-stabilized phosphated alumina, fluorided-alumina, alumina-aluminum phosphate, boria-alumina, magnesia-alumina, boria, magnesia, titania, zirconia, and the like. Certain of these materials also offer advantages in terms of ready attainment of suitable physical properties by steaming to increase the average pore diameter without appreciably decreasing pore volume. Support compositions presently preferred from the standpoint of catalyst performance are those comprising alumina. It is also preferred that the total concentration of porous refractory inorganic oxides other than alumina in the support material is less than 10 weight percent of the support material. Gamma-alumina supports which are suitable for use as the support material in the preparation of the catalyst employed in the method of the present invention are presently available commercially. In addition, a variety of conventional procedures can be employed for preparing support particles which can be used in the preparation of the catalyst employed in the method of the present invention.

The catalyst composition employed in the method of the present invention also comprises a molybdenum component and a chromium component on the aforesaid support material. The molybdenum component and chromium component are each in the form of the elemental metal, its oxide or sulfide or a combination thereof. The concentration of the molybdenum component present in the catalyst composition employed in the method of the present invention is from about 3 wt % to about 30 wt %, preferably from about 10 wt % to about 25 wt %, calculated as $MoO_3$ and based on the weight of the catalyst composition. The concentration of the chromium component present in the catalyst composition employed in the method of the present invention is from about 2 wt % to about 20 wt %, preferably from about 3 wt % to about 15 wt %, calculated as $Cr_2O_3$ and based on the weight of the catalyst.

Preferably, the catalyst composition employed in the method of the present invention also comprises at least one of a cobalt component and a nickel component, each in the form of the elemental metal, its oxide or sulfide or a combination thereof. Each of the cobalt component and nickel component that is present is at a concentration of from about 0.5 wt % to about 10 wt %, preferably from about 1 wt % to about 5 wt %, calculated as CoO or NiO, respectively, and based on the weight of the catalyst composition.

In general, any convenient conventional technique can be employed to deposit a precursor of the molybdenum component, a precursor of the chromium component, and optionally a precursor of at least one of the cobalt component and nickel component on the support particles. One technique of depositing the aforesaid metal component involves impregnation with a solution or solutions, usually aqueous, containing heat-decomposable salts of the molybdenum component, the chromium component and optionally at least one of the cobalt component and the nickel component. Following incorporation of the metal compounds into the support particles, the resulting impregnated particles are preferably calcined by heating the metal-containing support particles in the presence of a gas containing molecular oxygen at a temperature and for a time sufficient to convert the metal compounds to metal oxides. Preferred temperatures range from about 427° C. to about 649° C. and preferred times range from about 0.5 to about 20 hours.

Prior to use in hydrocarbon conversion, the catalysts employed in the method of the present invention can be subjected to a presulfiding treatment, if desired, to convert the metals in the metal components thereon to partially reduced metal sulfides which typically may be more active than their metal oxides. A sulfiding pretreatment that is preferred from the standpoint of cost and convenience involves contacting a catalyst with a mixture of hydrogen and hydrogen sulfide at varying pressures and increasing temperature over a period of time. Other suitable presulfiding treatments involve contacting the catalyst with hydrogen and carbon disulfide or a light hydrocarbon oil containing sulfur compounds at elevated temperature for a period of time sufficient to effect conversion of the metal components to metal sulfides.

The method of the present invention comprises contacting a solid carbonaceous material susceptible to upgrading with hydrogen in the presence of the above-described catalyst composition under hydrogenation conditions. Preferably, the carbonaceous material is selected from the group consisting of coal, coke, lignite, biomass, tar sands and oil shale. If the carbonaceous material is coal, coke, lignite or biomass, a hydrogen-donor solvent is also employed. More preferably, the carbonaceous material is coal.

When a hydrogen-donor solvent is employed, the carbonaceous material is contacted with the hydrogen-donor solvent at a weight ratio in the range preferably of from about 1:5 to about 8:2. A suitable hydrogen-donor solvent for use in the method of this invention contains at least 0.8 percent, and generally from about 1.2 to about 3 percent, and greater, of donatable hydrogen, based on the weight of the solvent. A suitable hydrogen-donor solvent thus generally contains about 30 weight percent, and usually about 50 weight percent, or greater, of an admixture of hydrogen-donor compounds, or precursors thereof, which, when hydrogenated, are adequate to supply the necessary hydrogen at reaction conditions, based on the total weight of the solvent. Hydrogen-donor compounds are well-known and comprise polycyclic aromatic hydrocarbons which are partially hydrogenated, generally having one or more of the nuclei at least partially saturated. Preferred hydrogen-donor compounds are either added from an external source, or generated in situ from precursors contained within a suitable solvent donor vehicle, these including indene, dihydronaphthalene, $C_{10}$–$C_{12}$ tetrahydronaphthalenes, hexahydrofluorine, the dihydro-, tetrahydro-, hexahydro-, and octahydrophenanthrenes, $C_{12}$–$C_{13}$ acenaphthenes, the tetrahydro-, hexahydro- and decahydropyrenes, the di-, tetra- and octahydroanthracenes, and other derivatives of partially saturated aromatic compounds.

In terms of hydrogen-donor potential, the hydrogen-donor solvent performs as a hydrogen-donor solvating medium. A preferred type of solvent is a thermally stable, polycyclic aromatic and hydroaromatic mixture which results from one or more petroleum refining operations, or is an indigenous liquid produced fraction which is recycled in the invention process or a liquid product produced from some other coal liquefaction technique such as Solvent Refined Coal-II. The hydrogen-donor solvent nominally has a boiling point above about 232° C. An essential feature of a hydrogen-donor solvent that is suitable for use in the method of this invention is that the solvent is substantially in the liquid state under the conditions employed in the method of this invention.

Illustrative of a suitable hydrogen-donor solvent is a highly aromatic, petroleum refinery resid such as fluidized catalytic cracker and catalytic reforming bottoms, which contain a substantial proportion of polycyclic aromatic hydrocarbon constituents, such as naphthalene, dimethylnaphthalene, anthracene, phenanthrene, fluorene, chrysene, pyrene, perylene, diphenyl, benzothiophene, tetralin, dihydronaphthalene, and the like. Such refractory petroleum media are resistant to conversion to lower molecular products by conventional nonhydrogenative procedures. Typically, these petroleum refinery residual and recycle fractions are hydrocarbonaceous mixtures having an average hydrogen-to-carbon ratio above about 0.7:1 and an initial boiling point above about 232° C.

A FCC main column bottoms refinery fraction is a highly preferred hydrogen-donor solvent for the practice of the present invention process. FCC main tower bottoms are obtained by the catalytic cracking of gas oil in the presence of a solid porous catalyst. A more complete description of the production of this petroleum fraction is disclosed in U.S. Pat. No. 3,725,240. A FCC main column bottoms fraction is an excellent hydrogen-donor solvent medium for solubilization of carbonaceous materials because it has a unique combination of physical properties and chemical constituency. A critical aspect of solvating ability is the particular proportions of aromatic and naphthenic and paraffinic moieties characteristic of a prospective hydrogen-donor solvent. A high content of aromatic and naphthenic structures in a solvent is a criterion for high solvating ability for liquefaction of carbonaceous material.

The method of the present invention is performed at a temperature in the range of from about 300° C. to about 500° C., a hydrogen partial pressure in the range of from about $1.37 \times 10^3$ kPa to about $2.06 \times 10^4$ kPa and a space velocity in the range of from about 0.1 to about 10 grams of carbonaceous material per gram of catalyst per hour. Preferably, the method of the present invention is performed at a temperature in the range of from about 375° C. to about 450° C., a hydrogen recycle or addition rate in the range of from 178 to about 3562 cubic meters of hydrogen per cubic meter of carbonaceous material and a space velocity in the range of from about 0.5 to about 5 grams of carbonaceous material per gram of catalyst per hour.

Fixed and expanded bed and slurry phase operations are contemplated for the practice of the method of the present invention. In fixed bed processes, the carbonaceous feed material and a hydrogen-containing gas are passed through a packed bed of catalyst under conditions, such as temperature, pressure, hydrogen flow rate, space velocity, etc., that vary somewhat depending on the choice of feed, reactor capacity and other factors known to persons of skill in the art. A catalyst in the form of spheres or extrudate, preferably about 0.25 to about 7.0 millimeters in diameter, give good results in terms of promoting adequate contact between catalyst and feed components while avoiding excessive pressure drop through a catalyst bed. More preferably, particles of about 0.80 to about 3.5 millimeters in diameter are used. Trilobe, cloverleaf, cross, and "C"-shaped catalysts such as those disclosed in commonly assigned U.S. Pat. No. 3,674,680 (Hoekstra et al.) give particularly good results in terms of maximizing catalyst efficiency and promoting a high level of contact between catalyst and feed components.

In expanded bed processes, a packed catalyst bed is expanded and mobilized by upflow of the carbonaceous feed material and hydrogen-containing gas at space velocities effective to provide adequate mobilization and expansion, and thereby promote contact between catalyst particles and reactants, without substantial carry over of catalyst particles. Preferred catlalysts for expanded-bed use are extrudates of about 0.25 to about 7.0 millimeters in diameter, with extrudates of about 0.80 millimeter being most preferred.

The present invention will be more clearly understood from the following specific examples.

EXAMPLE 1

A solution containing 24.7 grams of ammonium dichromate in 90 milliliters of water was mixed with 109.3 grams of Amocat 1A (trademark) extrudate support, whose composition and properties are presented in Table 1 and which was obtained from the Davison Chemical Division of W. R. Grace and Company. The resulting mixture was dried under a heat lamp and then calcined in air for about 60 hours at 538° C. To the resulting calcined material was added 90 millimeters of an aqueous solution containing 27.4 grams of ammonium heptamolybdate and 8.7 grams of cobalt nitrate hexahydrate. The resulting mixture was dried under a heat lamp and then calcined in air for 4 hours at 538° C. The composition and properties of the resulting chromium-, cobalt- and molybdenum- impregnated Amocat support are also presented in Table 1.

TABLE 1

| | Amocat Support | Amocat 1A | Co—, Mo— and Cr- Impregnated Amocat Support |
|---|---|---|---|
| Wt % Mo, as MoO$_3$ | 0 | 16.2 | 14.3 |
| Wt % Co, as CoO | 0 | 2.9 | 1.6 |
| Wt % Cr as Cr$_2$O$_3$ | 0 | 0 | 10.0 |
| Surface Area, m$^2$/gm (BET) | 214 | 186 | 152 |
| Total Pore Volume (macropore volume plus micropore volume) by Hg Penetration for >600Å plus nitrogen desorption for <600Å(cc/gm) | 0.97 | 0.80 | 0.65 |
| % of Total Pore Volume in Pores Having Diameters (Å) of: | | | |
| 0–200 | 81.3 | 78.3 | 78.1 |
| 200–400 | 2.6 | 3.2 | 3.4 |
| 400–600 | 1.0 | 1.1 | 1.4 |
| 600–1,000 | 1.1 | 4.0 | 1.6 |
| 1,000–10,000 | 11.0 | 13.4[1] | 12.6 |
| >10,000 | 3.0 | — | 2.9 |
| Average Micropore Diameter (Å) of | 157 | 129 | 148 |
| % of Micropore Volume by N$_2$ Desorption in Pores Having Diameters (Å) of: | | | |
| 0–50 | 2.9 | 4.2 | 2.8 |
| 50–80 | 14.0 | 15.8 | 13.3 |
| 80–100 | 24.6 | 21.6 | 23.3 |
| 100–130 | 32.8 | 29.1 | 31.8 |
| 130–150 | 11.5 | 12.2 | 11.1 |
| 150–200 | 8.2 | 9.4 | 8.5 |
| 200–400 | 3.1 | 3.8 | 3.9 |
| 400–600 | 1.1 | 1.3 | 1.7 |
| 600–1200 | 1.8 | 2.6 | 3.6 |

Footnote
[1] Includes pores having diameters greater than 10,000Å

EXAMPLES 2–3

Amocat 1A (trademark), a catalyst containing a cobalt component and a molybdenum component deposited on the gamma alumina Amocat (trademark) support, was employed in Example 2, and the catalyst containing a cobalt component, a molybdenum component and a chromium component deposited on the gamma alumina Amocat support and prepared in Example 1, was employed in Example 3. The properties of Amocat 1A are presented in Table 1.

In each of Examples 2 and 3, the catalyst employed was first dried in air at 538° C., and then 60 cubic centimeters (approximately 35 grams) of the catalyst employed was loaded into a basket in a stirred 370 cubic centimeter reactor. The catalyst employed was fixed in place in the reactor by filling the remaining space in the reactor with glass beads and glass wool. After the reactor was sealed, the reactor was flushed with a stream of nitrogen and heated to 260° C., and then the nitrogen was replaced by a stream containing 8 volume percent of hydrogen sulfide in hydrogen flowing at 112 liters per hour. Sulfiding of the catalyst employed with the hydrogen sulfide-hydrogen stream for 0.5 hour provided about 0.15 gram of sulfur per gram of the catalyst employed. The hydrogen sulfide-hydrogen stream was then replaced by a stream of hydrogen, and the reactor pressure was raised to $1.38 \times 10^4$ kPa. When the aforesaid reactor pressure was reached, a stream of hydrogenated anthracene oil containing 0.5 weight percent of methyl disulfide at 400 grams per hour and hydrogen at 225 liters per hour was passed through the reactor while it was heated to 440° C. When the temperature reached 440° C., the stream of anthracene oil was replaced by a slurry of 400+ mesh (U.S. Sieve Series) coal in a hydrogen-donor solvent.

In each of Examples 2 and 3, a constant hydrogen pressure of $1.38 \times 10^4$ kPa was maintained in the reactor with a continuous flow of hydrogen through the reactor at 225 liters per hour. The reactor was maintained at a temperature of 440° C., and the reactor contents were stirred at 1500 revolutions per minute. The space velocity was about 3 grams of coal per gram of catalyst per hour, and the residence time of the slurry in the reactor was about 44 minutes.

The system was operated continuously over a period of days and, at various intervals during this period, product leaving the reactor was collected and analyzed and its solubilities in tetrahydrofuran, benzene and hexane were determined. The extent of conversion of the coal to products which are soluble in tetrahydrofuran, benzene and hexane, one measure of catalyst performance, was calculated using the following relationships:

For tetrahydrofuran-soluble product $$X = \frac{(100 - M_c) - (A_c/A_{thf})}{100 - A_c - M_c} \cdot 100$$

For benzene- and hexane-soluble product $$X = \frac{(100 - M_c) - (I_a/I_{thf})(A_c/A_{thf})}{(100 - A_c - M_c)} \cdot 100$$

$M_c$ is the weight percent of moisture in the coal feed. $A_c$ is the weight percent of ash in the coal feed. $I_{thf}$ is the weight percent of tetrahydrofuran-insoluble material in the liquid product. $A_{thf}$ is the weight percent of ash in the tetrahydrofuran-insoluble portion of the liquid product. $I_a$ is the weight percent of benzene- or hexane-insoluble material in the liquid product.

The coal employed in each example was Illinois No. 6 whose composition is shown in Table 2. The hydrogen-donor solvent employed in each example was a heavy distillate fraction of the product of the Solvent Refined Coal-II liquefaction process and was obtained from Pittsburgh and Midway Mining Co. This hydrogen-donor solvent boils between 260° C. and 538° C. and contains a high concentration of partially hydrogenated multi-ring aromatic compounds. The results from Example 2 are presented in Tables 3, 4 and 5, and the results from Example 3 are presented in Tables 6, 7 and 8.

TABLE 2

| Composition of Illinois No. 6 Coal | |
|---|---|
| Component | Concentration (wt. %) |
| Moisture | 3.64 |
| Ash | 10.81 |
| Nitrogen | 1.31 |
| Hydrogen (Organic) | 4.37 |
| Oxygen (excluding the oxygen content of water) | 10.56 |
| Carbon | 67.42 |
| Sulfur | 2.61 |
| Atomic H/C, Organic H Only | 0.77 |

TABLE 3

| Sample No. | Hours on Stream | Residence Time (min.) | $I_{thf}$ | $I_{benzene}$ | $I_{n-C_6}$ | $A_{thf}$ |
|---|---|---|---|---|---|---|
| 1 | 17 | 43.9 | | 27.90 | 13.53 | |
| 2 | 24 | 44.8 | 5.60 | 9.01 | 14.94 | 54.64 |
| 3 | 41 | 44.7 | | 8.51 | 14.14 | |
| 4 | 48 | 44.8 | 5.50 | 9.20 | 15.13 | 55.30 |
| 5 | 65 | 43.9 | | 8.84 | 15.35 | |
| 6 | 72 | 44.7 | 5.26 | 9.70 | 16.20 | 54.25 |
| 7 | 89 | 42.0 | | 9.77 | 16.44 | |
| 8 | 96 | 42.7 | 5.35 | 10.51 | 17.16 | 53.38 |
| 9 | 113 | 43.7 | | 9.78 | 18.43 | |
| 10 | 120 | 43.2 | 6.60 | 10.97 | 19.02 | 54.44 |
| 11 | 138 | 44.6 | | 10.86 | 19.28 | |
| 12 | 144 | 44.8 | 5.28 | 11.52 | 19.60 | 55.61 |
| 13 | 161 | 45.0 | | 11.42 | 19.92 | |
| 14 | 168 | 43.4 | 5.33 | 12.14 | 20.00 | 54.42 |
| 15 | 185 | 45.8 | | 11.90 | 20.70 | |
| 16 | 192 | 43.8 | 5.41 | 12.41 | 21.08 | 53.87 |
| 19 | 233 | 43.8 | | 12.45 | 20.64 | |
| 20 | 240 | 43.4 | 5.37 | 12.82 | 21.05 | 54.01 |
| 25 | 305 | 44.4 | | 13.35 | 22.61 | |
| 26 | 312 | 43.9 | 5.02 | 13.55 | 22.88 | 53.09 |
| 31 | 377 | 48.7 | | 13.29 | 23.48 | |
| 32 | 384 | 44.9 | 5.54 | 14.25 | 23.88 | 51.98 |
| 39 | 473 | 42.2 | | 13.93 | 23.98 | |
| 40 | 480 | 43.6 | 5.30 | 13.66 | 23.18 | 53.32 |

TABLE 4

| Sample No. | Conversion to Solubles | | | Hydrogen Used %[1] |
|---|---|---|---|---|
| | $X_{thf}$ | $X_{benzene}$ | $X_{n-C_6}$ | |
| 1 | | 75.83 | 49.50 | |
| 2 | 86.38 | 70.08 | 42.92 | 6.31 |
| 3 | | 72.48 | 46.65 | |
| 4 | 86.85 | 69.19 | 42.03 | 6.56 |
| 5 | | 71.44 | 41.00 | |
| 6 | 87.99 | 66.93 | 37.03 | 6.07 |
| 7 | | 68.36 | 35.91 | |
| 8 | 87.92 | 64.45 | 32.55 | 5.17 |
| 9 | | 61.19 | 26.62 | |
| 10 | 81.99 | 61.97 | 23.87 | 4.59 |
| 11 | | 61.58 | 22.65 | |
| 12 | 87.87 | 58.36 | 21.16 | 4.37 |
| 13 | | 58.68 | 19.67 | |
| 14 | 87.88 | 56.37 | 19.29 | 4.26 |
| 15 | | 55.92 | 16.02 | |
| 16 | 87.44 | 54.84 | 14.25 | 3.76 |
| 19 | | 54.65 | 16.30 | |
| 20 | 87.70 | 53.20 | 14.39 | 3.57 |
| 25 | | 50.10 | 7.11 | |
| 26 | 89.24 | 49.45 | 5.85 | 3.37 |
| 31 | | 47.58 | 3.05 | |
| 32 | 86.64 | 45.54 | 1.18 | 3.08 |
| 39 | | 48.81 | 0.71 | |
| 40 | 87.99 | 49.16 | 4.45 | 3.00 |

Footnote [1] Weight percent based on the coal feed on a moisture- and ash-free basis

TABLE 5

| Sample No. | Heteroatom Removal (Wt %) | | |
|---|---|---|---|
| | Nitrogen | Oxygen | Sulfur |
| 1 | | | |
| 2 | 14.23 | 59.07 | 55.03 |
| 3 | | | |
| 4 | 13.15 | 52.54 | 55.68 |
| 5 | | | |
| 6 | 12.74 | 65.39 | 51.63 |
| 7 | | | |
| 8 | 7.83 | 53.72 | 48.20 |
| 9 | | | |
| 10 | 9.88 | 49.63 | 40.94 |
| 11 | | | |
| 12 | 4.13 | 46.29 | 42.49 |
| 13 | | | |
| 14 | 2.87 | 48.98 | 38.93 |
| 15 | | | |
| 16 | 1.28 | 45.49 | 38.46 |

TABLE 5-continued

| Sample No. | Heteroatom Removal (Wt %) | | |
|---|---|---|---|
| | Nitrogen | Oxygen | Sulfur |
| 19 | | | |
| 20 | 5.35 | 29.79 | 35.50 |
| 25 | | | |
| 26 | 5.60 | 25.92 | 33.77 |
| 31 | | | |
| 32 | 6.24 | 19.10 | 29.84 |
| 39 | | | |
| 40 | 2.58 | 19.66 | 30.43 |

TABLE 6

| Sample No. | Hours on Stream | Residence Time (min.) | $I_{thf}$ | $I_{benzene}$ | $I_{n-C_6}$ | $A_{thf}$ |
|---|---|---|---|---|---|---|
| 1 | 13.3 | 42.9 | | 6.52 | 11.91 | |
| 2 | 20.0 | 42.8 | 4.38 | 7.45 | 12.95 | 57.26 |
| 3 | 37.0 | 40.9 | | 8.04 | 13.96 | |
| 4 | 44.0 | 42.7 | 5.66 | 9.01 | 15.24 | 56.35 |
| 5 | 61.0 | 41.8 | | 8.53 | 14.93 | |
| 6 | 67.0 | 43.4 | 5.17 | 9.00 | 15.65 | 58.00 |
| 7 | 86.0 | 40.9 | | 8.84 | 15.63 | |
| 8 | 92.0 | 43.3 | 6.08 | 9.73 | 16.83 | 59.11 |
| 9 | 109.0 | 42.8 | | 9.06 | 16.17 | |
| 10 | 116.0 | 43.5 | 5.25 | 9.99 | 17.43 | 58.72 |
| 11 | 133.0 | 41.9 | | 9.35 | 16.88 | |
| 12 | 140.0 | 42.4 | 5.25 | 10.10 | 17.38 | 58.65 |
| 14 | 165.0 | 43.4 | 5.31 | 10.39 | 18.51 | 58.41 |
| 15 | 181.0 | 42.6 | | 10.61 | 19.20 | |
| 16 | 188.0 | 42.1 | 5.29 | 10.93 | 18.93 | 42.32 |
| 17 | 205.0 | 46.7 | | 9.40 | 17.27 | |
| 18 | 212.0 | 44.3 | 5.21 | 10.44 | 18.56 | 57.72 |

TABLE 7

| Sample No. | Conversion to Solubles | | | Resid Yield[1] | Dist.-to-Resid Yield Ratio | Hydrogen Used %[2] |
|---|---|---|---|---|---|---|
| | $X_{thf}$ | $X_{benzene}$ | $X_{n-C_6}$ | | | |
| 1 | | 82.95 | 57.06 | | | |
| 2 | 92.43 | 78.67 | 52.39 | 10.42 | 0.90 | 7.12 |
| 3 | | 77.15 | 47.49 | | | |
| 4 | 86.47 | 71.46 | 41.51 | 11.47 | 0.62 | 6.07 |
| 5 | | 74.23 | 42.96 | | | |
| 6 | 88.63 | 71.02 | 39.60 | 12.57 | 0.55 | 6.43 |
| 7 | | 73.42 | 39.69 | | | |
| 8 | 84.40 | 67.68 | 34.09 | 12.86 | 0.41 | 5.27 |
| 9 | | 71.16 | 37.17 | | | |
| 10 | 88.24 | 66.33 | 31.29 | 13.14 | 0.44 | 5.29 |
| 11 | | 70.34 | 33.86 | | | |
| 12 | 88.44 | 66.57 | 31.52 | 12.36 | 0.53 | 5.45 |
| 14 | 87.97 | 64.53 | 26.25 | 12.88 | 0.46 | 4.37 |
| 15 | | 64.06 | 23.03 | | | |
| 16 | 88.29 | 62.83 | 24.29 | 10.82 | 0.75 | 4.54 |
| 17 | | 67.04 | 32.04 | | | |
| 18 | 88.29 | 63.73 | 26.02 | 13.60 | 0.39 | 4.70 |

Footnotes
[1] Weight percent of liquid product
[2] Weight percent based on the coal feed on a moisture- and ash-free basis

TABLE 8

| Sample No. | Heteroatom Removal (Wt %) | | |
|---|---|---|---|
| | Nitrogen | Oxygen | Sulfur |
| 1 | | | |
| 2 | 17.98 | 53.36 | 62.57 |
| 3 | | | |
| 4 | 19.05 | 31.97 | 52.86 |
| 5 | | | |
| 6 | 17.22 | 57.08 | 52.68 |
| 7 | | | |
| 8 | 13.22 | 50.10 | 46.70 |
| 9 | | | |
| 10 | 11.31 | 42.57 | 48.00 |
| 11 | | | |
| 12 | 10.82 | 47.44 | 47.53 |
| 14 | 4.25 | 39.35 | 43.30 |

TABLE 8-continued

| Sample No. | Heteroatom Removal (Wt %) | | |
|---|---|---|---|
| | Nitrogen | Oxygen | Sulfur |
| 15 | | | |
| 16 | 6.56 | 42.33 | 42.77 |
| 17 | | | |
| 18 | 7.11 | 34.62 | 43.90 |

As indicated hereinabove, the degrees of conversion to tetrahydrofuran-soluble material ($X_{thf}$), to benzene-soluble material ($X_{benzene}$), and to n-hexane-soluble material ($X_{n-C6}$), which are presented in Tables 4 and 7 are measures of catalyst performance. Another measure of catalyst performance presented in Table 7 is the ratio of the yield of the distillate fraction of the liquid product to the yield of the resid fraction of the liquid product. The greater the yield of the more valuable distillate fraction relative to the yield of the resid fraction, the better is the catalyst performance. The distillate fraction and resid fraction are defined as the fraction boiling below 520° C. and the fraction boiling above 520° C., respectively.

Another measure of catalyst performance presented in Tables 4 and 7 is the level of consumption of hydrogen. The lower the hydrogen consumption for a given level of coal conversion, the better is the catalyst performance. Ideally, hydrogen is consumed in only those reactions which remove undesirable heteroatoms and reduce the viscosities and boiling points of the liquefaction products to desirable levels. For example, the formation of low molecular weight gaseous hydrocarbons and the extensive saturation of liquid products are not considered to be desirable uses of hydrogen. It is not possible to determine the hydrogen consumption by the difference between the hydrogen feed and effluent with any degree of certainty because only small amounts of hydrogen are consumed relative to the large hydrogen feedstream. Instead it is necessary to determine the change in hydrogen content of the liquid streams entering and leaving the reactor and include the hydrogen contained in the hydrocarbons and heteroatom-containing compounds leaving the reactor in the product gas stream.

Figure 2:
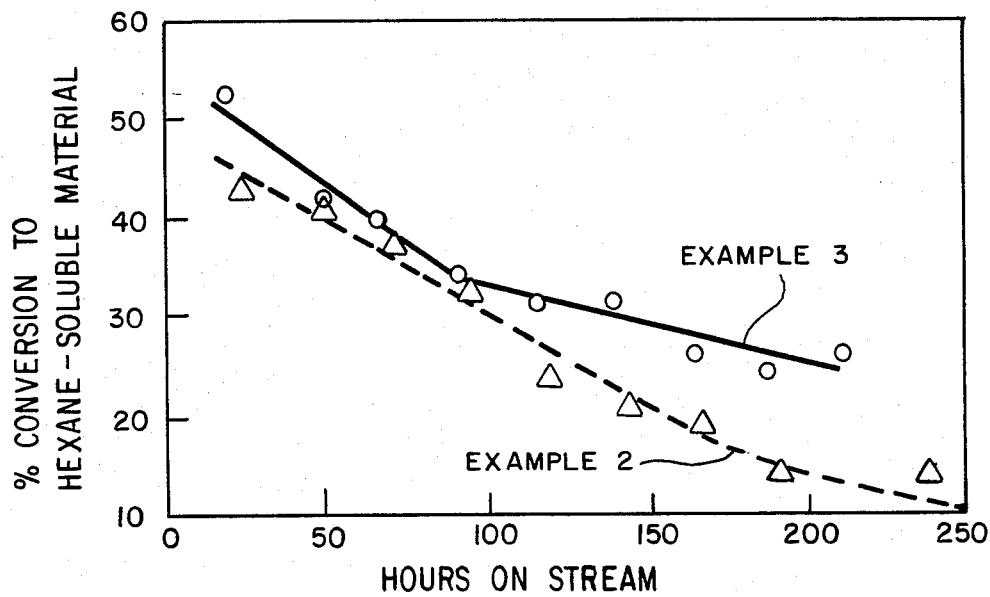
FIG. 2 is a plot of the extent of conversion in Examples 2 and 3 of coal to products which are soluble in hexane, versus the time on stream.

The results from Example 3 presented in Tables 6–8 indicate that the use of the catalyst of the present invention affords high distillate-to-resid yield ratios and low hydrogen consumption levels. Furthermore, comparison of the results from Examples 2 and 3 presented in Tables 3–8 and illustrated in FIGS. 1 and 2 illustrate that the use of the catalyst of the present invention containing a chromium component as well as a cobalt component and a molybdenum component, affords improved activity for the production of benzene-soluble products and hexane-soluble products and for the removal of heteroatoms from the products, and also affords reduced deactivation rates for the production of benzene-soluble products and hexane-soluble products and for the removal of heteroatoms from the products, by comparison to the use of a catalyst which does not contain a chromium component but which is otherwise the same as the catalyst of the present invention.

From the above description, it is apparent that the objects of the present invention have been achieved. While only certain embodiments have been set forth, alternative embodiments and various modifications will be apparent from the above description to those skilled in the art. These are considered equivalents and within the spirit and scope of the present invention.

What is claimed is:

1. A method for recovering upgraded liquid products from a solid carbonaceous material, comprising: contacting the solid carbonaceous material with hydrogen under hydrogenation conditions comprising a temperature in the range of from about 300° C. to about 500° C. in the presence of a hydrocarbon conversion catalyst consisting essentially of a molybdenum component and a chromium component on a porous refractory inorganic oxide support selected from the group consisting of alumina, silica, silica-alumina, stabilized alumina, phosphated alumina, stabilized phosphated alumina, fluorided alumina, alumina-aluminum phosphate, boria-alumina, magnesia-alumina, boria and magnesia, and having a surface area of from about 150 m²/gm to about 300 m²/gm, a total pore volume, as determined by nitrogen desorption measurement, of from about 0.4 cc/gm to about 0.8 cc/gm, with an average pore diameter of from about 100 Å to about 200 Å, with each metal component being in the form of the elemental metal, its oxide or sulfide or a mixture thereof, with the molybdenum component at a concentration of from about 3 wt % to about 30 wt %, calculated as $MoO_3$ and based on the weight of the catalyst, and with the chromium component at a concentration of from about 2 wt % to about 20 wt %, calculated as $Cr_2O_3$ and based on the weight of the catalyst, and wherein, when the carbonaceous material is coal, coke, lignite or biomass, the carbonaceous material is also contacted with a hydrogen-donor solvent.

2. The method of claim 1 wherein the molybdenum component is at a concentration of from about 10 wt % to about 25 wt %, calculated as $MoO_3$ and based on the weight of the catalyst.

3. The method of claim 1 wherein the chromium component is at a concentration of from about 3 wt % to about 15 wt %, calculated as $Cr_2O_3$ and based on the weight of the catalyst.

4. The method of claim 1 wherein the catalyst support is alumina.

5. The method of claim 1 wherein the catalyst has a surface area of from about 150 m²/gm to about 250 m²/gm.

6. The method of claim 1 wherein the catalyst has a total pore volume of at least 0.5 cc/gm.

7. The method of claim 1 wherein the average pore diameter of the catalyst is from about 110 Å to about 150 Å.

8. The method of claim 1 wherein the catalyst has from about 0% to about 10% of its total pore volume in pores having diameters under 50 Å, about 30% to about 80% of its total pore volume in pores having diameters of about 50 Å to about 100 Å, about 10% to about 50% of its total pore volume in pores having diameters of about 100 Å to about 150 Å, and about 0% to about 20% of its total pore volume in pores having diameters that are larger than 150 Å.

9. The method of claim 1 wherein the carbonaceous material and hydrogen donor solvent are combined in a weight ratio of from about 1:5 to about 8:2.

10. The method of claim 1 wherein the carbonaceous material is coal, coke, lignite, biomass, tar sands or oil shale.

11. The method of claim 1 wherein the hydrogen partial pressure is in the range of from about $1.37 \times 10^3$ kPa to about $2.06 \times 10^4$ kPa, and the space velocity is in the range of from about 0.1 to about 10 grams of carbonaceous material per gram of catalyst per hour.

12. A method for recovering upgraded liquid products from a solid carbonaceous material, comprising: contacting the solid carbonaceous material with hydrogen under hydrogenation conditions comprising a temperature in the range of from about 300° C. to about 500° C. in the presence of a hydrocarbon conversion catalyst consisting essentially of a molybdenum component, a chromium component and at least one of a cobalt component and a nickel component on a porous refractory inorganic oxide support selected from the group consisting of alumina, silica, silica-alumina, stabilized alumina, phosphated alumina, stabilized-phosphated alumina, fluorided alumina, alumina-aluminum phosphate, boria-alumina, magnesia-alumina, boria and magnesia and having a surface area of from about 150 $m^2/gm$ to about 300 $m^2/gm$, a total pore volume, as determined by nitrogen desorption measurement, of from about 0.4 cc/gm to about 0.8 cc/gm, with an average pore diameter of from about 100 Å to about 200 Å, with each metal component being wherein each of the cobalt component and nickel component that is present is in the form of the elemental metal, its oxide or sulfide or a mixture thereof, with the molybdenum component at a concentration of from about 3 wt % to about 30 wt %, calculated as $MoO_3$, and based on the weight of the catalyst, with the chromium component at a concentration of from about 2 wt % to about 20 wt %, calculated as $Cr_2O_3$ and based on the weight of the catalyst, and with each of the cobalt component and nickel component that is present is at a concentration of from about 0.5 wt % to about 10 wt %, calculated as CoO or NiO, respectively, and based on the weight of the catalyst, and wherein, when the carbonaceous material is coal, coke, lignite or biomass, the carbonaceous material is also contacted with a hydrogendonor solvent.

13. The method of claim 12 wherein each of the cobalt component and nickel component that is present in the catalyst is at a concentration from about 1 wt % to about 5 wt %, calculated as CoO or NiO, respectively, and based on the weight of the catalyst.

14. The method of claim 12 wherein the catalyst support is alumina.

15. The method of claim 12 wherein the catalyst has a surface area of from about 150 $m^2/gm$ to about 250 $m^2/gm$.

16. The method of claim 12 wherein the catalyst has a total pore volume of from about 0.5 cc/gm to about 0.7 cc/gm.

17. The method of claim 12 wherein the average pore diameter of the catalyst is from about 110 Å to about 150 Å.

18. The method of claim 12 wherein the catalyst has from about 0% to about 10% of its total pore volume in pores having diameters under 50 Å, about 30% to about 80% of its total pore volume in pores having diameters of about 50 Å to about 100 Å, about 10% to about 50% of its total pore volume in pores having diameters of about 100 Å to about 150 Å, and about 0% to about 20% of its total pore volume in pores having diameters that are larger than 150 Å.

19. The method of claim 12 wherein the hydrogen partial pressure is in the range of from about $1.37 \times 10^3$ kPa to about $2.06 \times 10^4$ kPa, and the space velocity is in the range of from about 0.1 to about 10 grams of carbonaceous material per gram of catalyst per hour.

* * * * *

UNITED STATES PATENT OFFICE
CERTIFICATE OF CORRECTION.

Patent No. 4,493,761    Dated January 15, 1985

Inventor(s) ALBERT L. HENSLEY, Jr. - LEONARD M. QUICK

It is certified that error appears in the above-identified patent and that said Letters Patent are hereby corrected as shown below:

| Col. | Line | | |
|---|---|---|---|
| 4 | 27 | After "present" | Add -- is -- |
| 6 | 20 | "component" | should read -- components -- |
| 8 | 60 | "millimeters" | should read -- milliliters -- |
| 11 | 5 | "27.90" | should read -- 7.90 -- |
| 11 | 49 | "49.1" | should read -- 49.14 -- |
| 13 | 13 | "(Xn-C6)" | should read -- $(X_n-C_6)$ -- |

Signed and Sealed this

Twenty-fourth Day of September 1985

[SEAL]

Attest:

Attesting Officer

DONALD J. QUIGG

Commissioner of Patents and Trademarks—Designate